(12) United States Patent
Nalepa et al.

(10) Patent No.: US 9,101,907 B2
(45) Date of Patent: Aug. 11, 2015

(54) USE OF BROMIDE-CONTAINING INORGANIC SALT FOR REDUCING MERCURY EMISSIONS FROM COMBUSTION GAS STREAMS

(75) Inventors: Christopher J. Nalepa, Zachary, LA (US); Qunhui Zhou, Baton Rouge, LA (US)

(73) Assignee: Albemarle Corporation, Baton Rouge, LA (US)

( * ) Notice: Subject to any disclaimer, the term of this patent is extended or adjusted under 35 U.S.C. 154(b) by 0 days.

(21) Appl. No.: 14/232,326

(22) PCT Filed: Jul. 12, 2012

(86) PCT No.: PCT/US2012/046468
§ 371 (c)(1),
(2), (4) Date: Jan. 13, 2014

(87) PCT Pub. No.: WO2013/009983
PCT Pub. Date: Jan. 17, 2013

(65) Prior Publication Data
US 2014/0140908 A1      May 22, 2014

Related U.S. Application Data

(60) Provisional application No. 61/507,426, filed on Jul. 13, 2011.

(51) Int. Cl.
*B01J 20/20*    (2006.01)
*B01D 53/10*    (2006.01)
*B01D 53/64*    (2006.01)

(52) U.S. Cl.
CPC ............... *B01J 20/20* (2013.01); *B01D 53/10* (2013.01); *B01D 53/64* (2013.01); *B01D 2251/108* (2013.01); *B01D 2253/102* (2013.01); *B01D 2253/25* (2013.01); *B01D 2257/602* (2013.01); *B01D 2258/0283* (2013.01); *B01D 2259/128* (2013.01)

(58) Field of Classification Search
CPC ............................... B01D 53/10; B01D 53/64
USPC ......................................... 423/210; 252/186.24
See application file for complete search history.

(56) References Cited

U.S. PATENT DOCUMENTS 6,953,494 B2 * 10/2005 Nelson, Jr. ..................... 95/134
2011/0030592 A1    2/2011  Baldrey et al.
2011/0076210 A1 *  3/2011  Pollack et al. ............... 423/210

FOREIGN PATENT DOCUMENTS

| DE | 102009057432 | 6/2011 |
| GB | 22122916 | 1/1984 |
| WO | 2009020953 | 2/2009 |
| WO | 2012030560 | 3/2012 |

\* cited by examiner

*Primary Examiner* — Richard M Rump
(74) *Attorney, Agent, or Firm* — Marcy M. Hoefling; James A. Jubinsky; Nathan C. Dunn

(57) ABSTRACT

Compositions, and processes utilizing such compositions, are provided for reducing mercury emissions from combustion gases. Such compositions comprise a wood-derived or coconut shell-derived activated carbon and/or a bromide-containing inorganic salt such as an ammonium bromide or calcium bromide salt.

1 Claim, 1 Drawing Sheet

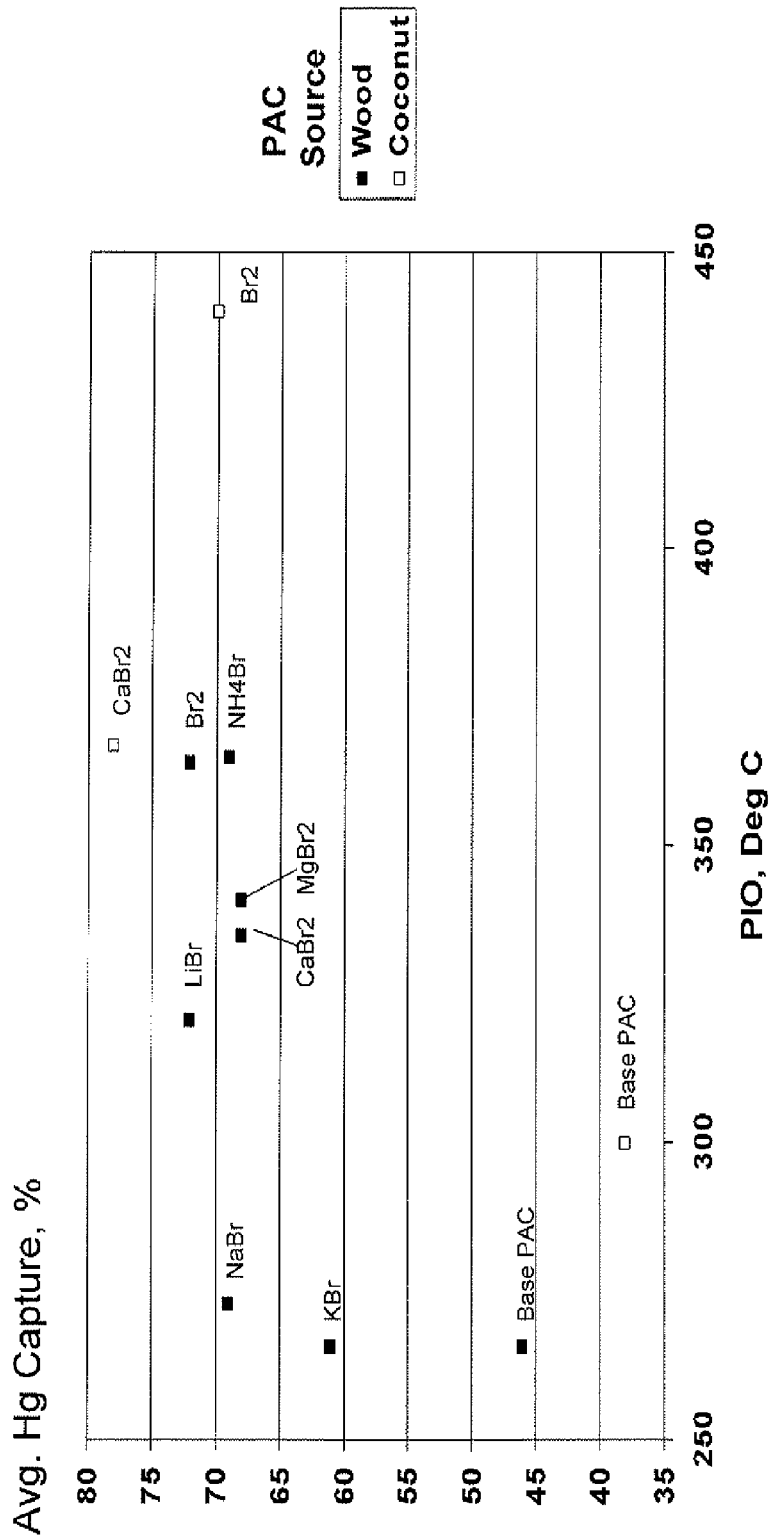

USE OF BROMIDE-CONTAINING INORGANIC SALT FOR REDUCING MERCURY EMISSIONS FROM COMBUSTION GAS STREAMS

BACKGROUND

In December of 2011, the EPA issued the final Mercury and Air Toxics Standards (MATS) for power plants. MATS requires significant reduction in mercury emissions.

Some mercury can be removed from coal-fired power plant flue gas by $SO_2$ control devices. However, flue gases from coal-fired plants normally comprise significant quantities of elemental mercury and oxidized mercury; and $SO_2$ control devices are suitable for removing oxidized mercury, but not elemental mercury. Low levels of bromine, or aqueous solutions of alkali or alkali-earth metal salts of bromine, such as calcium bromide or sodium bromide, can be used to oxidize the elemental mercury in flue gases. However, when the bromide is oxidized, it results in the formation of bromine. At least some of the bromine can interact with elemental mercury to form mercury salts, such as $HgBr_2$. The excess of bromide value relative to the amount of Hg to be removed results in a significant amount of bromine remaining in the flue gas, which is known to be corrosive to scrubber systems and other equipment in the plant.

Given the foregoing, it would be commercially beneficial to have methods for minimizing mercury emissions from coal-fired power plant flue gases that are suitable for removing both oxidized and elemental mercury from the flue gases without causing corrosion in the plant.

THE INVENTION

This invention meets the above-described needs by providing processes that comprise adding an ammonium bromide or calcium bromide salt and a wood-derived or coconut shell-derived activated carbon to a combustion gas stream to reduce mercury emissions from the combustion gas stream. This invention also provides processes that comprise adding an ammonium bromide or calcium bromide salt and a wood-derived or coconut shell-derived activated carbon to a combustible fuel prior to and/or during combustion of the combustible fuel. The ammonium bromide or calcium bromide salt and the wood-derived or coconut shell-derived activated carbon can be added separately to the combustion gas stream and/or combustible fuel or can be combined and added to the combustion gas stream and/or combustible fuel as a composition. This invention also provides compositions suitable for reducing mercury emissions from a combustion gas stream, such compositions comprising an ammonium bromide or calcium bromide salt and a wood-derived or coconut shell-derived activated carbon. Additionally, this invention provides processes that comprise adding a bromide-containing inorganic salt to a combustion gas stream to reduce mercury emissions from the combustion gas stream. This invention is beneficial in that the inorganic salts can be mixed with carbons derived from wood or coconut shells, which are renewable resources, to enhance the thermal stability of these carbons.

As used herein, including in the claims, the term "reducing mercury emissions" means removing any amount of mercury from the emissions by any mechanism, e.g., adsorption or absorption, such that the amount of mercury emitted into the atmosphere upon burning of the fuel is reduced as compared to the amount that would be emitted absent use of the compositions and/or processes of this invention. Additionally, this invention contemplates adding other inorganic salts and other carbon-based sorbents to a combustion gas stream or to a combustible fuel before and/or during combustion in order to reduce mercury emissions in the combustion gas stream, and sorbent compositions comprising other inorganic salts and other carbon-based sorbents for achieving mercury emission reductions in combustion gas streams.

Bromide-containing inorganic salts, wood-derived or coconut shell-derived sorbents, and/or compositions according to this invention can be added to/combined with combustion gas streams and/or combustible fuels in the form of a solid, e.g., in powder or granule form, or in the form of a liquid. Same can be added to a combustion gas stream that is at a temperature from about 150 deg C. to about 450 deg C. For example, in cold-side ESPs (electrostatic precipitators), injection of same can take place at combustion gas stream temperatures from about 150 deg C. to about 200 deg C. In hot-side ESPs, injection of same can take place at combustion gas stream temperatures from about 300 deg C. to about 450 deg C.

These and other aspects of the invention are described herein. Reference is made to the FIG. (or FIG. 1), which provides data discussed in the Examples.

Bromide-Containing inorganic Salt

Bromide-containing inorganic salts useful in this invention include, without limitation, LiBr, CaBr2, HBr, MgBr2, and NH4Br.

Sorbent

Sorbents that are suitable for use in this invention include wood-derived and coconut shell-derived carbons. Wood-derived powdered activated carbons ("PACs") are particularly suitable for use in this invention, including those derived from sawdust, woodchips, or other particulate wood products. Coconut shell-derived PACs are also suitable for use in this invention. Other sorbents that are suitable for use in this invention include, for example, activated carbon, activated charcoal, activated coke, carbon black, powdered coal, char, unburned or partially-burned carbon from a combustion process, kaolinites or other clays, zeolites, alumina, and other carbonaceous substrates. Other suitable sorbents will be known, or may come to be known, to those skilled in the art and having the benefit of the teachings of this specification.

Sorbent Compositions

Procedures for preparing sorbent compositions of this invention are simple and commercially advantageous when compared, e.g., to preparation and handling of brominated active carbon. A suitable procedure comprises dry-blending a bromide-containing inorganic salt with the sorbent. Other suitable procedures for combining one or more bromide-containing inorganic salts with a sorbent, such as activated carbon, will be known, or may come to be known, to those skilled in the art and having the benefit of the teachings of this specification.

In a process according to this invention, one or more bromide-containing inorganic salts can be added to a combustion gas stream upstream to the injection of sorbent, e.g., activated carbon that has not previously been treated with the bromide-containing inorganic salt; thus providing what can be termed an "instant sorbent composition".

Thermal Stability

A significant finding of the present invention is that certain inorganic bromide salts have surprisingly been found to greatly improve the thermal stability of certain PAC materials, which provides for application of such PAC materials in high-temperature areas in systems associated with the combustion of coal and other fuels. Thermal stability of a substance can be assessed, e.g., via the temperature of initial energy release, a.k.a., the point of initial oxidation (PIO) of the substance. As used in this specification, including the claims, the PIO of compositions and/or sorbents of this invention is defined as the temperature at which the heat flow, as determined by DSC, is 1.0 W/g with the baseline corrected to zero at 100 deg C. A composition of this invention has improved thermal stability as compared to the sorbent that is used in such composition in that the composition has a PIO that is at least about 10 deg C. higher than the PIO of the sorbent alone. A composition of this invention can have a PIO that is at least about 10 deg C. to about 150 deg C., or about 10 deg C. to about 110 deg C., or about 10 deg C. to about 80 deg C., or about 20 deg C. to about 70 deg C., higher than the PIO of the sorbent alone.

Combustible Fuels

Processes and sorbent compositions of this invention are suitable for reducing mercury emissions in combustion gas streams resulting from combustion of any combustible fuel comprising mercury. Such combustible fuels include coal, solid or fluid waste, and other substances.

Treatment of Flue Gas from Coal-Fired or Other Combustible Fuel-Fired Power Plant to Reduce Mercury Emissions Also in methods and systems of this invention, a composition comprising a bromide-containing inorganic salt and a sorbent, or at least a portion of the composition, can be added to mercury-containing exhaust gas to reduce emission of mercury with the gas. For example, the composition can be added to flue gas in coal-fired power plants to reduce mercury emissions. All statements made herein regarding addition to coal-fired power plants are equally applicable to addition to other combustible fuel-fired power plants.

The composition can be inserted or injected into the convective pathway of the coal burning facility to reduce the mercury levels. The composition can be added into a zone of the convective pathway downstream of the fireball (caused by combustion of the coal), which zone has a temperature above about 1500 deg F. (816 deg C.) and less than the fireball temperature of about 2200 deg F. (1204 deg C.) As with pre-combustion addition, the composition can be in the form of a liquid or a solid (powder). The rate of addition of composition into the convective pathway can be varied depending on the results of mercury monitoring as described herein.

For either treatment of the coal or the flue gas, the composition can be added in an amount such that there is at least about 1000 times the bromine or bromide value on a weight basis based on the amount of mercury in the coal to be/being burned. Such levels are generally known to affect at least about 90% reduction in mercury emissions in the flue gas. Given the teachings of this specification, one skilled in the art can determine the amount of composition needed to provide lesser amounts of mercury reduction, e.g., 70% reduction, 80% reduction, etc. Typically for a liquid solution, more can be used, as compared to solid of the same composition. For example, when the composition comprises $NH_4Br$, at least about 120 ppm, or 1000 times the typical value of Hg in coal, which is 0.1 ppm, can be added, based on the coal to be/being burned. Also, given the teachings of this specification, one skilled in the art can determine the appropriate amounts of composition to effect, e.g., at least about 70% reduction in mercury emissions in the flue gas, at least about 80% reduction, etc.

A mercury sorbent injected into flue gas should have good thermal stability and provide good mercury capture. Wood-based and coconut shell-based PACs are both known to be relatively thermally unstable compared to PACs derived from other sources such as anthracite and bituminous coal. Like PACs from these other sources, wood-based and coconut shell-based PACs are not efficient for capturing mercury from low-halogen flue gases.

Wood-based PAC, after treatment with ammonium bromide ($NH_4Br$), calcium bromide ($CaBr_2$), magnesium bromide ($MgBr_2$), or lithium bromide (LiBr), showed an increase in thermal stability of 50 to 100° C., as determined by PIO. The improvement in thermal stability with these treatments was very surprising and unanticipated as KBr and NaBr do not provide any improvement in thermal stability. Mercury capture was also greatly improved over the base carbon. Coconut-based PAC, after treatment with ammonium bromide ($NH_4Br$) and calcium bromide ($CaBr_2$), also showed an increase in thermal stability with PIOs at least 50° C. greater than the base PAC. Mercury capture of the CaBr2-treated PAC was very high and even better than a comparable bromine-treated PAC.

Using certain bromide salts to increase the thermal stability and the mercury capture performance of PAC base materials derived from renewable wood and coconut-shell sources represents a commercially advantageous process.

When methods and systems of this invention are utilized, mercury emissions into the environment from the coal burning facility are reduced by at least about 70%, at least about 80%, or even at least about 90%, based on the total mercury in the coal being burned. As used in this application, a mercury reduction of at least about 70% means at least about 70% of the mercury in the coal being burned is captured to prevent its release into the atmosphere. A sufficient amount of a composition comprising a bromide-containing inorganic salt and a sorbent as described herein can be added to the coal prior to or during combustion to reduce the mercury emissions into the environment by at least about 70% or more, or can be used to treat the flue gas to obtain the same result, or a portion of the composition can be added to the coal prior to or during combustion and a portion of the composition can be used to treat the flue gas.

Mercury emissions can be monitored with conventional analytical equipment using industry standard detection and determination methods, for example, by using methods published by the American Society for Testing and Materials (ASTM) or international standards published by the International Standards Organization (ISO). The Ontario Hydro method can be used. In this known method, gases are collected for a pre-determined time, for example one hour. Mercury is precipitated from the collected gases, and the level is quantitated using a suitable method such as atomic absorption. Monitoring can also be done more or less frequently than once an hour, depending on technical and commercial feasibility. In general, monitoring can be conducted periodically, either manually or automatically. For example, mercury emissions can be monitored once an hour to ensure compliance with government regulations. Commercial continuous mercury monitors can be set to measure mercury and produce a number at a suitable frequency, for example once every 3-7 minutes. Mercury can be monitored in the convective pathway at suitable locations. For example, mercury released into the atmosphere can be monitored and measured on the clean side of the particulate control system. Mercury can also be monitored at a point in the convective pathway upstream of the particulate control system. An apparatus comprising an analytical instrument can be disposed in the convective pathway downstream of the addition points of compositions comprising bromide-containing inorganic salts according to this invention. The output of the mercury monitors can be used to control the rate of addition of compositions comprising bromide-containing inorganic salts as described herein. Depending on the results of monitoring, the rate of addition of the composition can be adjusted by either increasing the level of addition, decreasing it, or leaving it unchanged. To illustrate, if monitoring indicates mercury levels are higher than desired, the rate of addition of composition can be increased until mercury levels return to a desired level. If mercury levels are at desired levels, the rate of composition addition can remain unchanged. Alternatively, the rate of composition addition can be lowered until monitoring indicates it should be increased to avoid high mercury levels. The measured level of mercury can be used to provide feedback signals to pumps, solenoids, sprayers, and other devices that are actuated or controlled to adjust the rate of addition of composition into the coal burning system. Alternatively, or in addition, the rate of composition addition can be adjusted by a human operator based on the observed levels of mercury emissions.

Experiments have shown that as much as 20 to 30% of the mercury in coal is captured in the ash and not released into the atmosphere when no mercury emission reduction agent is added. This invention is advantageous in that addition of compositions according to this invention raises the amount of mercury capture (and thus reduces the amount of mercury emissions) to at least about 70%.

Treatment of Coal to Reduce Mercury Emissions During Combustion

In methods and systems of this invention, a composition comprising a bromide-containing inorganic salt and a sorbent, or at least a portion of the composition, can be added to coal either before or during coal combustion to reduce mercury emissions during combustion.

A composition comprising a bromide-containing inorganic salt and a sorbent, as described herein can be added to/onto coal prior to its combustion. For example, the coal can be particulate coal, and can optionally be pulverized or powdered according to conventional procedures. The composition can be added onto the coal as a liquid or as a solid. Generally, solid compositions are in the form of a powder. If the composition is added as a liquid, the coal can remain wet when fed into the burner. The composition can be added onto the coal continuously at the coal burning facility by spraying or mixing onto the coal while it is on a conveyor, screw extruder, or other feeding apparatus. In addition or alternatively, the composition may be separately mixed with the coal at the coal burning facility or at the coal producer. The composition can be added as a liquid or a powder to the coal as it is being fed into the burner. For example, the composition can be applied into the pulverizers that pulverize the coal prior to injection. If desired, the rate of addition of the composition can be varied to achieve a desired level of mercury emissions. The level of mercury in the flue gases can be monitored and the level of composition addition adjusted up or down as required to maintain the desired mercury level.

The composition comprising a bromide-containing inorganic salt and a sorbent as described herein can be added to coal in batch or continuously. With continuous addition, the treat levels can be based on the feed rate of the coal being burned. Where the composition is added in batch, such as at the coal producer or at a separate mixing facility, the treat level can be based on the weight of the coal being treated. Additionally, the rate of addition or the treat level can be adjusted based on a determination of emitted levels of mercury.

EXAMPLES

The following examples are illustrative of the principles of this invention. It is understood that this invention is not limited to any one specific embodiment exemplified herein, whether in the examples or the remainder of this patent application. The data from both of Examples 1 and 2 is illustrated in the FIG. (FIG. 1).

Example 1

A wood-derived PAC (powdered activated carbon) (prepared by the thermal activation process) utilized in these examples was analyzed by DSC-TGA. The point of initial oxidation (PIO) was 266 deg C.

Preparation Procedure I—

A sample of the wood-derived PAC was brominated according to the process disclosed in U.S. Pat. No. 6,953,494. Elemental analysis indicated a PAC bromine content of 5 wt %.

Preparation Procedure II—

A series of treated PACs were prepared by slurrying the wood-derived PAC with various sources of ionic bromide and then drying by placing in a recirculating oven at 60-80 deg C. The treated PAC bromine value was 5 wt %.

The performance of these treated PACs was compared. Performance tests included DSC, which measures of the thermal properties of the activated carbon.

The following data compares the thermal stability of the various PACs as determined by DSC as well as average mercury capture capabilities (Hg, %). The point of initial energy release (PIO) was compared for all of the samples.

| Preparation Procedure | Bromide Source | PIO, ° C. | Hg, % |
|---|---|---|---|
| I | none (comparative) | 266 | 46 |
| I | elemental bromine (comparative) | 362 | 72 |
| II | KBr | 266 | 61 |
| II | NaBr | 273 | 69 |
| II | LiBr | 321 | 72 |
| II | CaBr2 | 335 | 68 |
| II | MgBr2 | 341 | 68 |
| II | NH4Br | 365 | 69 |

Example 2

A coconut shell-derived PAC (powdered activated carbon) (prepared by the thermal activation process) utilized in these examples was analyzed by DSC-TGA. The point of initial oxidation (PIO) was 300 deg C.

Preparation Procedure I—

A sample of the coconut shell-derived PAC was brominated according to the process disclosed in U.S. Pat. No. 6,953,494. Elemental analysis indicated a PAC bromine content of 5 wt %.

Preparation Procedure II—

A series of treated PACs were prepared by slurrying the coconut shell-derived PAC with various sources of ionic bromide and then drying by placing in a recirculating oven at 60-80 deg C. The treated PAC bromine value was 5 wt %.

The performance of these treated PACs was compared. Performance tests included DSC, which measures of the thermal properties of the activated carbon.

The following data compares the thermal stability of the various PACs as determined by DSC as well as average mercury capture capabilities (Hg, %). The point of initial energy release (PIO) was compared for all of the samples.

| Preparation Procedure | Bromide Source | PIO, °C. | Hg, % |
|---|---|---|---|
| I | none (comparative) | 300 | 38 |
| I | elemental bromine (comparative) | 440 | 70 |
| II | NaBr | 354 | no data |
| II | CaBr2 | 367 | 78 |
| II | NH4Br | 446 | no data |

This invention can be quite advantageous in that handling of elemental bromine is not required. Additionally, addition of a bromide-containing inorganic salt to an activated wood-derived or coconut shell-derived carbon is very facile and can be accomplished via a number of conventional solid mixing techniques. Mixing of a bromide-containing inorganic salt with activated carbon typically does not require specialized materials of construction as no corrosive and hazardous halogen vapors are created or released.

Another advantage is that sorbent compositions of this invention require no activation step, i.e. after thorough mixing of activated carbon and a bromide-containing inorganic salt, a sorbent composition of this invention is ready for use without subsequent treatment such as heating.

Addition of a bromide-containing inorganic salt to activated carbon at low temperatures (<150 deg C.) results in no substantial absorption or uptake of bromine into the pores of the activated carbon. Thus substantially all sites remain available for adsorption of mercury in the combustion gas stream.

Unless otherwise specified, this invention is not limited to any specific embodiment(s) exemplified herein, whether in lists of suitable components or otherwise.

It is to be understood that the reactants and components referred to by chemical name or formula anywhere in the specification or claims hereof, whether referred to in the singular or plural, are identified as they exist prior to being combined with or coming into contact with another substance referred to by chemical name or chemical type (e.g., another reactant, a solvent, or etc.). It matters not what chemical changes, transformations and/or reactions, if any, take place in the resulting combination or solution or reaction medium as such changes, transformations and/or reactions are the natural result of bringing the specified reactants and/or components together under the conditions called for pursuant to this disclosure. Thus the reactants and components are identified as ingredients to be brought together in connection with performing a desired chemical reaction or in forming a combination to be used in conducting a desired reaction. Accordingly, even though the claims hereinafter may refer to substances, components and/or ingredients in the present tense ("comprises", "is", etc.), the reference is to the substance, component or ingredient as it existed at the time just before it was first contacted, combined, blended or mixed with one or more other substances, components and/or ingredients in accordance with the present disclosure. Whatever transformations, if any, which occur in situ as a reaction is conducted is what the claim is intended to cover. Thus the fact that a substance, component or ingredient may have lost its original identity through a chemical reaction or transformation during the course of contacting, combining, blending or mixing operations, if conducted in accordance with this disclosure and with the application of common sense and the ordinary skill of a chemist, is thus wholly immaterial for an accurate understanding and appreciation of the true meaning and substance of this disclosure and the claims thereof. As will be familiar to those skilled in the art, the terms "combined", "combining", and the like as used herein mean that the components that are "combined" or that one is "combining" are put into a container, e.g., a combustion chamber, a pipe, etc. with each other. Likewise a "combination" of components means the components having been put together in such a container.

While the present invention has been described in terms of one or more preferred embodiments, it is to be understood that other modifications may be made without departing from the scope of the invention, which is set forth in the claims below.

What is claimed is:

1. A process consisting of:
combining components consisting of an ammonium bromide or calcium bromide salt and a wood-derived or coconut shell-derived activated carbon at a temperature less than 150 deg C, and
producing a composition suitable for reducing mercury emissions from a combustion gas stream, wherein the composition has a PIO that is at least about 50 deg C higher than the PIO of the activated carbon alone.

* * * * *